United States Patent
Luo et al.

(10) Patent No.: US 11,910,336 B2
(45) Date of Patent: Feb. 20, 2024

(54) SIGNAL TRANSMISSION METHOD AND RELATED DEVICE

(71) Applicant: HUAWEI TECHNOLOGIES CO., LTD., Shenzhen (CN)

(72) Inventors: Zhihu Luo, Beijing (CN); Zhe Jin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 295 days.

(21) Appl. No.: 17/374,130

(22) Filed: Jul. 13, 2021

(65) Prior Publication Data
US 2021/0345268 A1 Nov. 4, 2021

Related U.S. Application Data

(63) Continuation of application No. PCT/CN2020/071048, filed on Jan. 9, 2020.

(30) Foreign Application Priority Data

Jan. 18, 2019 (CN) .......................... 201910049429.2

(51) Int. Cl.
*H04W 56/00* (2009.01)
*H04W 72/0446* (2023.01)
(Continued)

(52) U.S. Cl.
CPC ..... *H04W 56/001* (2013.01); *H04W 72/0446* (2013.01); *H04W 72/0453* (2013.01); *H04W 72/30* (2023.01)

(58) Field of Classification Search
CPC ........... H04W 56/001; H04W 72/0446; H04W 72/0453; H04W 72/30; H04L 5/005;
(Continued)

(56) References Cited

U.S. PATENT DOCUMENTS

2018/0324732 A1 11/2018 Park et al.
2018/0343156 A1* 11/2018 Malik .................. H04J 11/0073
(Continued)

FOREIGN PATENT DOCUMENTS

CN 101527595 A 9/2009
CN 108270710 A 7/2018
(Continued)

OTHER PUBLICATIONS

Rico Alvarino et al., An Overview of 3GPP Enhancements on Machine to Machine Communications, IEEE Communications Magazine, Jun. 2016, pp. 14-21 (Year: 2016).*
ZTE. "Considerations on DL reference signals and channels design for NT-U." 3GPP TSG RAN WG1 Meeting #94. R1-1808319. Gothenburg, Sweden. Aug. 20-24, 2018. 7 pages.
(Continued)

*Primary Examiner* — Shailendra Kumar
(74) *Attorney, Agent, or Firm* — Maier & Maier, PLLC

(57) ABSTRACT

A signal transmission method and a related device, to transmit a signal between a network device and a terminal device. The method in the embodiments includes: sending a first synchronization signal/broadcast channel block (SSB) to a first terminal device, where the first SSB includes a synchronization signal and a physical broadcast channel (PBCH), the synchronization signal and the PBCH use a frequency division multiplexing (FDM) manner in resource occupation, a quantity of orthogonal frequency division multiplexing (OFDM) symbols occupied by the synchronization signal is greater than 2, and a quantity of OFDM symbols occupied by the PBCH is greater than 3.

18 Claims, 10 Drawing Sheets

(51) Int. Cl.
*H04W 72/0453* (2023.01)
*H04W 72/30* (2023.01)

(58) Field of Classification Search
CPC . H04L 5/0092; H04L 27/2613; H04L 5/0053; H04L 27/2662; H04L 27/2671; H04L 27/2672
See application file for complete search history.

(56) References Cited

U.S. PATENT DOCUMENTS

| | | | | |
|---|---|---|---|---|
| 2019/0215790 | A1* | 7/2019 | Kim | H04L 5/0042 |
| 2021/0392592 | A1* | 12/2021 | Ko | H04L 5/0048 |

FOREIGN PATENT DOCUMENTS

| | | | | |
|---|---|---|---|---|
| CN | 108282317 | A | | 7/2018 |
| CN | 108282842 | A | | 7/2018 |
| CN | 108631843 | A | | 10/2018 |
| WO | 2017217719 | A1 | | 12/2017 |
| WO | WO-2017217719 | A1 | * 12/2017 | ........... H04B 7/0639 |
| WO | 2019062371 | A1 | | 4/2019 |
| WO | WO-2019062371 | A1 | * 4/2019 | |

OTHER PUBLICATIONS

Zte et al. "NR-SS: Bandwidth, Multiplexing." 3GPP TSG RAN WG1 AH_NR Meeting. R1-1700097. Spokane, USA. Jan. 16-20, 2017. 10 pages.
Spreadtrum Communications "Remaining issues on OFDM signal generation." 3GPP TSG RAN WG1 Meeting AH 1801. R1-1800284. Vancouver, Canada. Jan. 22-26, 2018. 10 pages.
Huawei et al. "Discussion and evaluation on broadcast channel/signals transmission for beam based initial access." 3GPP TSG RAN WG1 NR Ad Hoc Meeting. R1-1700047. Spokane, USA. Jan. 16-20, 2017. 8 pages.
Rico-Alvarino et al., "An Overview of 3GPP Enhancements on Machine to Machine Communications", Jun. 1, 2016, XP011614727, pp. 14-21.
Mysore Balasubramanya et al., "DRX With Quick Sleeping: A Novel Mechanism for Energy-Efficient IoT Using LTE/LTE-A", IEEE Internet of Things Journal; Jun. 1, 2016, XP011609793, pp. 398-407.
Lin et al., "SS/PBCH Block Design in 5G New Radio (NR)", 2018 IEEE Globecom Workshops (GC Wkshps), IEEE, Dec. 9, 2018 (Dec. 9, 2018), XP033519270, pp. 1-6.
NTT Docomo, Inc., "Discussion on initial access design for NR", 3GPP TSG RAN WG1 Meeting #86bis, Lisbon, Portugal, Oct. 10-14, 2016, R1-1610073, 7 pages.

* cited by examiner

SIGNAL TRANSMISSION METHOD AND RELATED DEVICE

CROSS-REFERENCE TO RELATED APPLICATIONS

This application is a continuation of International Application No. PCT/CN2020/071048, filed on Jan. 9, 2020. Which claims priority to Chinese Patent Application No. 201910049429.2, filed on Jan. 18, 2019. The disclosures of the aforementioned applications are hereby incorporated by reference in their entireties.

TECHNICAL FIELD

The embodiments relate to the communications field, and in particular, to a signal transmission method and a related device.

BACKGROUND

A new radio (NR) technology in a fifth generation mobile communications system (5G) defines a synchronization signal/broadcast channel block (SS/PBCH block, SSB). One SSB includes a primary synchronization signal (PSS), a secondary synchronization signal (SSS), and a physical broadcast channel (PBCH). In time domain, one SSB occupies four consecutive orthogonal frequency division multiplexing (OFDM) symbols, and in frequency domain, one SSB occupies 20 resource blocks (RB).

An internet of things (IoT) refers to an "internet in which things are interconnected". An SSB oriented to the internet of things is referred to as an NSSB (narrowband SS/PBCH block), an MSSB (MTC SS/PBCH block), or an LPWA SSB (low power wide area SS/PBCH block). A design of the internet of things requires features such as low power consumption and enhanced coverage.

In an NR system, one SSB occupies 20 resource blocks, which are a relatively large quantity of resources. However, considering that both traffic and users are greatly reduced at night in a running process of a base station, and in response to the requirement of the internet of things for low power consumption, the base station requires only a small part of resources to maintain normal system running at night. Consequently, energy is wasted during communication of the base station.

SUMMARY

Embodiments disclose a signal transmission method and a related device, to transmit a signal between a network device and a terminal device.

A first aspect of the embodiments provides a signal transmission method, including:
sending, by a network device, a first SSB to a first terminal device, where the first SSB includes a synchronization signal and a physical broadcast channel. Because the synchronization signal and the physical broadcast channel use a frequency division multiplexing manner in resource occupation, a time domain resource occupied by the first SSB is reduced, thereby reducing power consumption of the base station.

In addition, compared with an existing SSB in which an SSS occupies one OFDM symbol, a PSS occupies one OFDM symbol, and a PBCH occupies three OFDM symbols, in the embodiments, a quantity of OFDM symbols occupied by the synchronization signal is greater than 2, and a quantity of OFDM symbols occupied by the PBCH is greater than 3, so that the synchronization signal and the broadcast channel occupy more OFDM symbols, energy can be accumulated in time domain, and signal coverage can be enhanced.

This embodiment has the following advantages: when the base station sends the SSB to the terminal device, the synchronization signal and the PBCH in the SSB use the frequency division multiplexing manner in resource occupation, thereby reducing a time domain resource occupied by the SSB, so that the base station can intelligently shut down some carriers, subframes, or symbols at night or during low-traffic hours to reduce power consumption. In addition, compared with an existing NR system, the quantity of OFDM symbols occupied by the synchronization signal is greater than 2, and the quantity of OFDM symbols occupied by the PBCH is greater than 3, so that it can be ensured that an internet of things system in the embodiments achieves coverage that is the same as or greater than that of the existing NR system.

Based on the first aspect, in a first feasible manner of the first aspect, the synchronization signal may be a complete signal, or may be split into an SSS and a PSS, where a quantity of OFDM symbols occupied by the PSS is greater than 1, and a quantity of OFDM symbols occupied by the SSS is greater than 1.

In this embodiment, compared with a current solution in which a synchronization signal generally includes an SSS and a PSS, the synchronization signal in the embodiments may be a complete signal and have functions of both the SSS and the PSS, thereby improving diversity of solution implementation. In addition, the SSS and the PSS occupy more OFDM symbols, so that energy can be accumulated in time domain, and signal coverage can be enhanced.

Based on the first aspect, in a second feasible manner of the first aspect, that the synchronization signal and the PBCH use a frequency division multiplexing (FDM) manner in resource occupation includes:
the PSS and the PBCH use the FDM manner in resource occupation, or the SSS and the PBCH use the FDM manner in resource occupation, or the PSS and the PBCH use the FDM manner in resource occupation and the SSS and the PBCH use the FDM manner in resource occupation.

In this embodiment, resource occupation manners of the synchronization signal and the PBCH are described in detail, thereby improving solution feasibility.

Based on the first or the second feasible manner of the first aspect, in a third feasible manner of the first aspect, in a possible case, a frequency domain position of the PBCH may be indicated by using the PSS, or may be indicated by using the SSS, or may be indicated jointly by using the PSS and the SSS. For example, the PSS is generated by using a sequence, and the frequency domain position of the PBCH may be indicated by using the sequence of the PSS. For example, an index of the sequence of the PSS may indicate the frequency domain position of the PBCH, and frequency domain position information of the PBCH may be included in an initialization seed of the sequence of the PSS. For another example, the SSS is generated by using a sequence, and the frequency domain position of the PBCH may be indicated by using the sequence of the SSS. For example, an index of the sequence of the SSS may indicate the frequency domain position of the PBCH, and frequency domain position information of the PBCH may be included in an initialization seed of the sequence of the SSS. For still another example, the PSS is generated by using a sequence, the SSS is generated by using a sequence, and the frequency domain position of the PBCH may be jointly indicated by using the sequence of the PSS and the sequence of the SSS. For example, an index of the sequence of the PSS and an index of the sequence of the SSS may jointly indicate the frequency domain position of the PBCH, and frequency domain position information of the PBCH may be included in initialization seeds of both the sequence of the PSS and the sequence of the SSS.

In another possible case, a frequency domain position of the PBCH is obtained based on a frequency domain position of the PSS, or the frequency domain position of the PBCH is obtained based on a frequency domain position of the SSS, or the frequency domain position of the PBCH is obtained based on frequency domain positions of the PSS and the SSS. In another possible case, the frequency domain position of the PBCH is obtained based on a time domain position of the PSS, or the frequency domain position of the PBCH is obtained based on a time domain position of the SSS, or the frequency domain position of the PBCH is obtained based on time domain positions of the PSS and the SSS. For example, the frequency domain position of the PBCH is determined within a specific time based on a time sequence of the PSS and the SSS. For example, if the PSS is ahead of the SSS within the specific time, it indicates that the frequency domain position of the PBCH is a preset first frequency domain position. If the PSS is later than the SSS within the specific time, it indicates that the frequency domain position of the PBCH is a preset second frequency domain position.

In another possible case, the frequency domain position of the PBCH is obtained based on time domain and frequency domain positions of the PSS, or the frequency domain position of the PBCH is obtained based on time domain and frequency domain positions of the SSS, or the frequency domain position of the PBCH is obtained based on time domain and frequency domain positions of the PSS and the SSS.

In this embodiment, cases of determining the frequency domain position of the PBCH are described in detail, thereby improving solution feasibility.

Based on the first aspect and the first and the second feasible manners of the first aspect, in a fourth feasible manner of the first aspect, the method further includes:

sending, by the network device, a second SSB to a second terminal device, where the second terminal device and the first terminal device are terminal devices in different communications systems. The second terminal device is a terminal device in an NR system. The first terminal device may also be a terminal device in an NR system, but the NR system in which the first terminal device is located and the NR system in which the second terminal device is located are different NR systems. Alternatively, the first terminal device may be a terminal device in an LTE system, an LTE-A system, or another communications system.

A structure and a resource occupation manner of the second SSB may be similar to those of the first SSB, or the second SSB may be an SSB in an existing NR system. This is not limited herein.

In this embodiment, the second SSB and the first SSB occupy a same time domain resource.

In this embodiment, when sending the first SSB to the first terminal in a first communications system, the base station may also send the second SSB to the second terminal in a second communications system. The second SSB and the first SSB occupy a same time domain resource. In this case, at night or during low-traffic hours, the base station may intelligently shut down a carrier, a subframe, or a symbol that is neither occupied by the first SSB nor by the second SSB, to achieve energy saving of the base station.

Based on the fourth feasible manner of the first aspect, in a fifth feasible manner of the first aspect, that the second SSB and the first SSB occupy a same time domain resource may be that the first SSB and the second SSB may occupy half-frames at a same time domain position.

In a possible case, the second SSB and the first SSB occupy a same quantity of half-frames within a preset time length, and time domain positions of the occupied half-frames are also the same. For example, the first SSB occupies half-frames 1, 2, 3, 4, and 5, and the second SSB also occupies half-frames 1, 2, 3, 4, and 5.

Alternatively, the second SSB and the first SSB occupy different quantities of half-frames within a preset time length, and time domain positions of some of the half-frames occupied by the second SSB and the first SSB are the same. In this case, a quantity of half-frames occupied by the first SSB is greater than that of the second SSB. In other words, the first SSB occupies some half-frames that are not occupied by the second SSB. For example, the first SSB occupies half-frames 1, 2, 3, 4, 5, and 6, and the second SSB occupies half-frames 1, 2, 3, 4, and 5.

In this embodiment, the first SSB and the second SSB occupy half-frames at a same location. In this case, at night or during low-traffic hours, the base station may intelligently shut down a half-frame that is neither occupied by the first SSB nor by the second SSB, to achieve energy saving of the base station.

Based on the fourth feasible manner of the first aspect, in a sixth feasible manner of the first aspect, the first SSB and the second SSB may alternatively occupy half-frames at different time domain positions.

For example, the second SSB and the first SSB occupy a same quantity of half-frames within a preset time length, and time domain positions of the occupied half-frames are different. For example, the first SSB occupies half-frames 1, 3, and 5, and the second SSB occupies half-frames 2, 4, and 6.

Alternatively, the second SSB and the first SSB occupy different quantities of half-frames within a preset time length, and time domain positions of the occupied half-frames are different. For example, the first SSB occupies half-frames 1, 3, and 5, and the second SSB occupies half-frames 2, 4, 6, and 8.

In this embodiment, the first SSB and the second SSB may alternatively occupy half-frames at different locations, thereby improving diversity of solution implementation. Based on the fifth feasible manner of the first aspect, in a seventh feasible manner of the first aspect, if the first SSB and the second SSB occupy half-frames at a same location, and one half-frame includes five subframes, in one half-frame, a subframe occupied by the PSS may be the same as that of the second SSB in the NR system in time domain, and a subframe occupied by the SSS may also be the same as that of the second SSB in the NR system in time domain.

Alternatively, in one half-frame, an OFDM symbol occupied by the PSS is the same as that of the second SSB in the NR system, and an OFDM symbol occupied by the SSS is the same as that of the second SSB in the NR system.

In this embodiment, the second SSB and the first SSB occupy a same subframe or OFDM symbol. In this case, at night or during low-traffic hours, the base station may intelligently shut down a subframe or an OFDM symbol that is neither occupied by the first SSB nor by the second SSB, to achieve energy saving of the base station.

Based on the fourth to the seventh feasible manners of the first aspect, in an eighth feasible manner of the first aspect, a GSCN of the first SSB may be carried in a system information of the NR system.

In this embodiment, a case of indicating a frequency domain position of the first SSB is described, thereby facilitating solution implementation.

Based on the first to the seventh feasible manners of the first aspect, in a ninth feasible manner of the first aspect, the PSS and the SSS may use a time division multiplexing manner or the frequency division multiplexing manner in resource occupation.

In this embodiment, the PSS and the SSS use the frequency division multiplexing manner, thereby further saving a time domain resource and facilitating energy saving of the base station.

A second aspect of the embodiments provides a signal transmission method, including:
  receiving, by a first terminal device, a first SSB sent by a network device, where the first SSB includes a synchronization signal and a physical broadcast channel. The synchronization signal and the physical broadcast channel use FDM manner in resource occupation, so that a time domain resource occupied by the SSB is reduced, thereby reducing power consumption of the base station.

In addition, compared with an existing SSB in which an SSS occupies one OFDM symbol, a PSS occupies one OFDM symbol, and a PBCH occupies three OFDM symbols, in the embodiments, a quantity of OFDM symbols occupied by the synchronization signal is greater than 2, and a quantity of OFDM symbols occupied by the PBCH is greater than 3, so that the synchronization signal and the broadcast channel occupy more OFDM symbols, energy can be accumulated in time domain, and signal coverage can be enhanced.

Based on the second aspect, in a first feasible manner of the second aspect, a composition of the synchronization signal is similar to that in the first feasible manner of the first aspect, and details are not described herein again.

Based on the first feasible manner of the second aspect, in a second feasible manner of the second aspect, resource occupation manners of the synchronization signal and the PBCH are similar to those in the second feasible manner of the first aspect, and details are not described herein again.

Based on the first or the second feasible manner of the second aspect, in a third feasible manner of the second aspect, cases of indicating a frequency domain position of the PBCH are similar to those in the third feasible manner of the first aspect, and details are not described herein again.

Based on the second aspect and the first to the third feasible manners of the second aspect, in a fourth feasible manner of the second aspect, the first SSB and the second SSB may occupy half-frames at a same time domain position. A specific feasible case is similar to that in the fifth feasible manner of the first aspect, and details are not described herein again.

Based on the second aspect and the fourth feasible manner of the first aspect, in a fifth feasible manner of the second aspect, resource occupation of the first SSB and the second SSB in a same half-frame are similar to that in the sixth feasible manner of the first aspect, and details are not described herein again.

Based on the second aspect and the first to the third feasible manners of the first aspect, in a sixth feasible manner of the second aspect, a GSCN of the first SSB may be carried in a system information of an NR system.

Based on the second aspect and the first to the third feasible manners of the first aspect, in a seventh feasible manner of the second aspect, the PSS and the SSS use a time division multiplexing manner or the frequency division multiplexing manner in resource occupation.

A third aspect of the embodiments provides a network device, which has a function performed by the network device in any one of the first aspect or the implementations of the first aspect. The function may be implemented by using corresponding software or hardware. The communications apparatus may include one or more units corresponding to the function.

A fourth aspect of the embodiments provides a terminal device, which has a function performed by the terminal device in any one of the second aspect or the implementations of the second aspect. The function may be implemented by using corresponding software or hardware. The communications apparatus may include one or more units corresponding to the function.

A fifth aspect of the embodiments provides a network device, including a memory, a transceiver, a processor, and a bus system.

The memory is configured to store a program and instructions.

The transceiver is configured to receive or send information under control of the processor.

The processor is configured to execute the program in the memory.

The bus system is configured to connect the memory, the transceiver, and the processor, so that the memory, the transceiver, and the processor communicate with each other.

The processor is configured to invoke the program and the instructions in the memory to perform all or some steps of the method in the first aspect.

A sixth aspect of the embodiments provides a terminal device, including a memory, a transceiver, a processor, and a bus system.

The memory is configured to store a program and instructions.

The transceiver is configured to receive or send information under control of the processor.

The processor is configured to execute the program in the memory.

The bus system is configured to connect the memory, the transceiver, and the processor, so that the memory, the transceiver, and the processor communicate with each other.

The processor is configured to invoke the program and the instructions in the memory to perform all or some steps of the method in the second aspect.

A seventh aspect of the embodiments provides a computer storage medium. The computer storage medium includes operation instructions, and when the operation instructions are run on a computer, the computer is enabled to perform the method according to either of the first aspect and the second aspect.

An eighth aspect of the embodiments provides a computer program product. When the computer program product runs on a computer, the computer is enabled to perform the method according to either of the first aspect and the second aspect.

DETAILED DESCRIPTION OF THE EMBODIMENTS

Considering that both traffic and users are greatly reduced at night in a running process of a base station, if the base station still works in full configuration, some energy is wasted. To save energy, the base station may shut down a carrier, a subframe, or a symbol at night or during low-traffic hours, to achieve energy saving of the base station without affecting overall network performance and user perception. The embodiments provide an internet of things system design, to enable a base station to save energy.

The embodiments may be applied to a long term evolution (LTE) system, an advanced long term evolution (LTE Advanced, LTE-A) system, or a fifth generation (5G) NR system. The embodiments may be further applied to another communications system in which a signal receiving entity and a signal sending entity exist.

In embodiments, a first SSB may be a candidate first SSB, and a second SSB may be a candidate second SSB. The candidate first SSB means that a base station may send the first SSB, but does not necessarily send the first SSB. The candidate second SSB is similar thereto.

Figure 1:
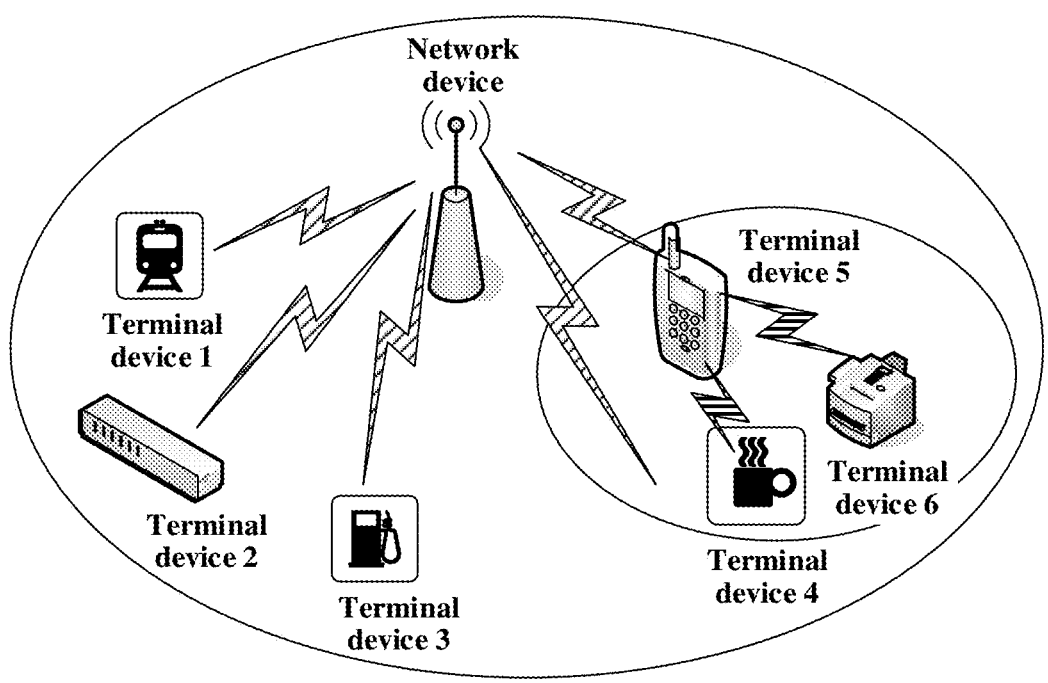
FIG. 1 is a system architectural diagram.

A system architectural diagram is shown in FIG. 1. In the figure, a network device and terminal devices 1 to 6 form a communications system, and the network device communicates with the terminal device 1 to the terminal device 6. The terminal devices 4 to 6 also form a communications system, and the terminal device 4 may communicate with the terminal device 5 or the terminal device 6.

The network device in the embodiments may be an access network device such as a base station, a macro base station, a micro base station (also referred to as a "small cell"), a pico base station, or an access point (AP). For example, the access network device may be a new generation NodeB (gNB/gNodeB), a transmission reception point (TRP), an evolved NodeB (eNB), a radio network controller (RNC), a NodeB (NB), a base station controller (BSC), a base transceiver station (BTS), a home base station (for example, home evolved NodeB, Home NodeB, HNB), a baseband unit (BBU), or the like.

Figure 2:
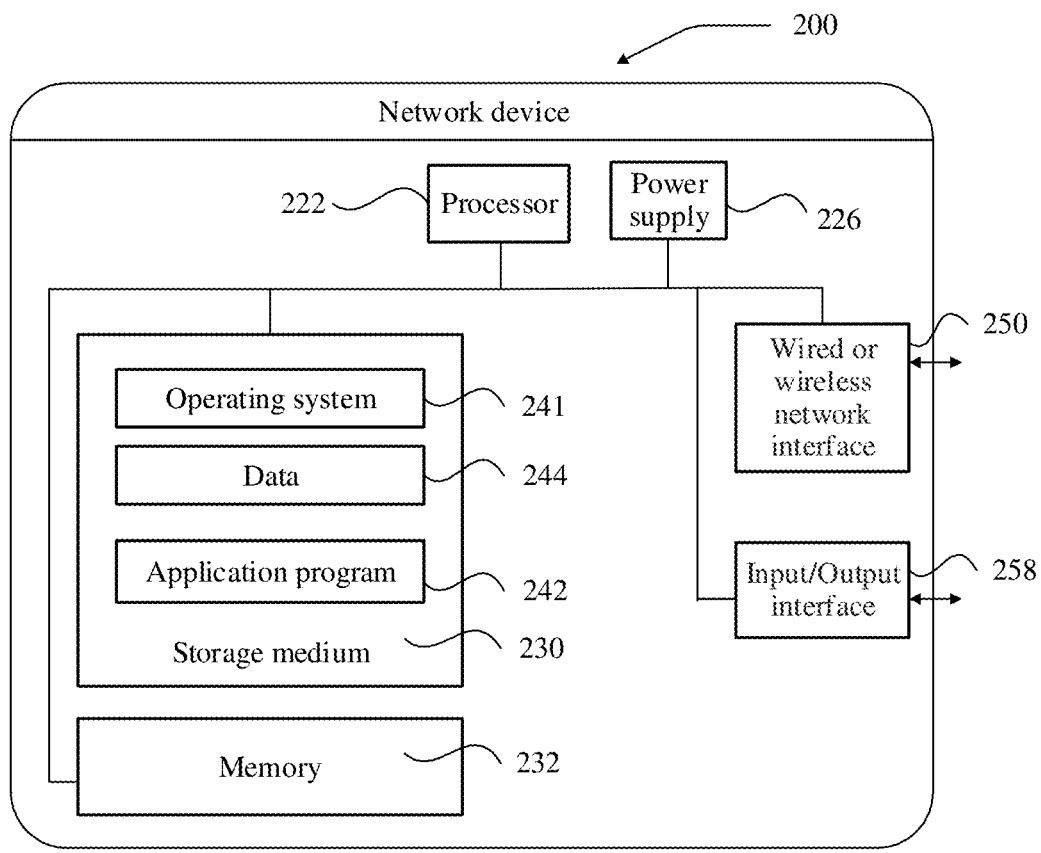
FIG. 2 shows a possible structure of a network device.

FIG. 2 is a schematic structural diagram of a network device according to an embodiment. The network device 200 may vary greatly with different configurations or performance, and may include one or more processors 222, a memory 232, and one or more storage media 230 (for example, one or more mass storage devices) storing an application program 242 or data 244. The processor 222 may be a central processing unit (CPU). The memory 232 and the storage medium 230 may be transitory memories or persistent memories. The program stored in the storage medium 230 may include one or more modules (not shown in the figure), and each module may include a series of instruction operations in the network device. Furthermore, the processing unit 222 may be configured to communicate with the storage medium 230, and perform a series of instruction operations in the storage medium 230 on the network device 200.

The memory 232 may be configured to store a program for implementing the following method embodiment. The processor 222 invokes the program, to perform all or some operations in the following method embodiment.

The embodiments further relate to a terminal device, also referred to as user equipment (UE), which is a device that provides voice and/or data connectivity for a user, for example, a handheld device or a vehicle-mounted device having a wireless connection function. Currently, some examples of the terminal device are a mobile phone, a tablet computer, a notebook computer, a palmtop computer, a mobile internet device (MID), and a wearable device such as a smart watch, a smart band, and a pedometer.

Figure 3:
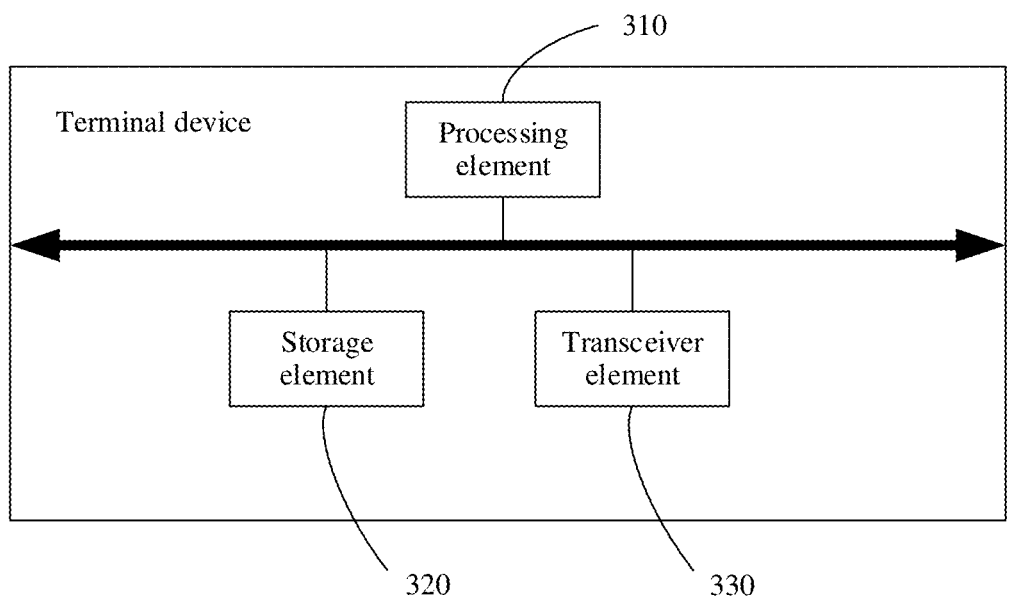
FIG. 3 shows a possible structure of a terminal device.

FIG. 3 is a schematic structural diagram of a terminal device according to an embodiment. As shown in FIG. 3, the terminal device includes: a processing element 310, a storage element 320, and a transceiver element 330. The transceiver element 330 may be connected to an antenna. In a downlink direction, the transceiver element 330 receives, by using the antenna, information sent by a network device, and sends the information to the processing element 310 for processing. In an uplink direction, the processing element 310 processes data of the terminal device, and sends the data of the terminal device to the network device by using the transceiver element 330.

The storage element 320 is configured to store a program for implementing the following method embodiment. The processing element 310 invokes the program, to perform an operation in the following method embodiment.

In another implementation, the foregoing units may be configured as one or more processing elements for implementing the following method. These processing elements are disposed on a circuit board of the terminal device. The processing elements herein may be integrated circuits, for example, one or more ASICs, one or more DSPs, or one or more FPGAs. These integrated circuits may be integrated to form a chip.

For example, the foregoing units may be integrated, and implemented in a system-on-a-chip (SOC) form. For example, the terminal device includes the SOC chip, to implement the foregoing method. The chip may be integrated with the processing element 310 and the storage element 320, and the processing element 310 invokes the program stored in the storage element 320 to implement the foregoing method or functions of the foregoing units. Alternatively, the chip may be integrated with at least one integrated circuit, to implement the foregoing method or functions of the foregoing units. Alternatively, the foregoing implementations may be combined, so that functions of some units are implemented by the processing element by invoking a program, and functions of some units are implemented by using an integrated circuit.

Regardless of which manner is used, the apparatus includes at least one processing element and a storage element, and the at least one processing element is configured to perform the method provided in the foregoing method embodiment. The processing element may perform, in a first manner, that is, by running a program stored in the storage element, some or all steps in the following method embodiment; or may perform, in a second manner, that is, by using a hardware-integrated logical circuit in the processing element and instructions, some or all steps in the following method embodiment; or certainly, may perform, in the first manner and the second manner, the method provided in the foregoing method embodiment.

The processing element herein is the same as that in the foregoing description, and may be a general-purpose processing element, for example, a central processing unit (CPU), or may be configured as one or more integrated circuits for implementing the foregoing method, for example, one or more application-specific integrated circuits (ASIC), or one or more digital signal processors (DSP), or one or more field-programmable gate arrays (FPGA).

The storage element may be a memory, or a general name of a plurality of storage elements.

Figure 4:
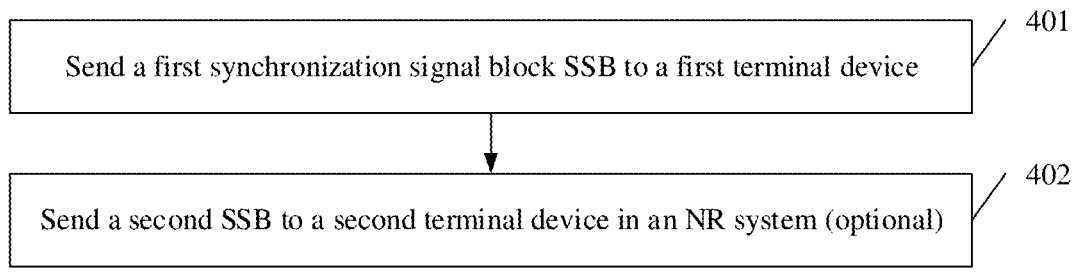
FIG. 4 is a schematic diagram of an embodiment of a signal transmission method.

Based on the foregoing network device structure, the embodiments provide a signal transmission method. Referring to FIG. 4, the method includes the following steps.

First, when the embodiments are applied to an internet of things, a first SSB is an NSSB, an MSSB, or an LPWA SSB in the internet of things. The internet of things requires low costs, low energy consumption, enhanced coverage, and support of a large quantity of low-rate devices. Based on this, in the embodiments, a synchronization signal and a physical broadcast channel occupy a resource through (FDM, to achieve energy saving of a base station, and a quantity of OFDM symbols occupied by the synchronization signal and the physical broadcast channel is increased to achieve coverage enhancement.

401. Send a first synchronization signal/physical broadcast channel block SSB to a first terminal device.

A network device sends the first SSB to the first terminal device. The first SSB includes a synchronization signal and a physical broadcast channel. Because the synchronization signal and the physical broadcast channel use a frequency division multiplexing manner in resource occupation, a time domain resource occupied by the first SSB is reduced, thereby reducing power consumption of the base station.

In this embodiment, the synchronization signal may be a complete signal and have functions of both an SSS and a PSS, or may be split into an SSS and a PSS. That the synchronization signal and the PBCH use an FDM manner in resource occupation may be that the PSS and the PBCH use the FDM manner in resource occupation and the SSS and the PBCH use the FDM manner in resource occupation, or the PSS and the PBCH use the FDM manner in resource occupation, or the SSS and the PBCH use the FDM manner in resource occupation. This is not limited herein. Regardless of which resource occupation manner described herein is used for the SSS, the PSS, and the PBCH in the synchronization signal, in a possible case, a frequency domain position of the PBCH may be indicated by using the PSS, or may be indicated by using the SSS, or may be indicated jointly by using the PSS and the SSS. For example, the PSS is generated by using a sequence, and the frequency domain position of the PBCH may be indicated by using the sequence of the PSS. For example, an index of the sequence of the PSS may indicate the frequency domain position of the PBCH, and frequency domain position information of the PBCH may be included in an initialization seed of the sequence of the PSS. For another example, the SSS is generated by using a sequence, and the frequency domain position of the PBCH may be indicated by using the sequence of the SSS. For example, an index of the sequence of the SSS may indicate the frequency domain position of the PBCH, and frequency domain position information of the PBCH may be included in an initialization seed of the sequence of the SSS. For still another example, the PSS is generated by using a sequence, the SSS is generated by using a sequence, and the frequency domain position of the PBCH may be jointly indicated by using the sequence of the PSS and the sequence of the SSS. For example, an index of the sequence of the PSS and an index of the sequence of the SSS may jointly indicate the frequency domain position of the PBCH, and frequency domain position information of the PBCH may be included in initialization seeds of both the sequence of the PSS and the sequence of the SSS.

In another possible case, the frequency domain position of the PBCH may be obtained based on a frequency domain position of the PSS. For example, it is preset that the PBCH is located on one or more resource blocks adjacent to and above that of the PSS, or it is preset that the PBCH is located on one or more resource blocks adjacent to and below that of the PSS. Alternatively, the frequency domain position of the PBCH may be obtained based on a frequency domain position of the SSS. For example, it is preset that the PBCH is located on one or more resource blocks adjacent to and above that of the SSS, or it is preset that the PBCH is located on one or more resource blocks adjacent to and below that of the SSS. Alternatively, the frequency domain position of the PBCH may be obtained based on frequency domain positions of both the PSS and the SSS. For example, in FIG. 6(*a*), in frequency domain, one PBCH is located on an RB adjacent to that of a PSS, and another PBCH is located on an RB adjacent to that of an SSS. For example, in FIG. 6(*c*), in frequency domain, a PBCH is located only on an RB adjacent to that of an SSS.

In another possible case, the frequency domain position of the PBCH is obtained based on a time domain position of the PSS, or the frequency domain position of the PBCH is obtained based on a time domain position of the SSS, or the frequency domain position of the PBCH is obtained based on time domain positions of the PSS and the SSS. For example, the frequency domain position of the PBCH is determined within a specific time based on a time sequence of the PSS and the SSS. For example, if the PSS is ahead of the SSS within the specific time (for example, as shown in FIG. 6(*a*) or FIG. 6(*b*), the PSS is ahead of the SSS in a time sequence), it indicates that the frequency domain position of the PBCH is a preset first frequency domain position. If the PSS is later than the SSS within the specific time, it indicates that the frequency domain position of the PBCH is a preset second frequency domain position.

In another possible case, the frequency domain position of the PBCH is obtained based on time domain and frequency domain positions of the PSS. For example, in FIG. 6(*a*), a time domain position of a PBCH is the same as that of a PSS, and in frequency domain, the PBCH is located on an RB adjacent to that of the PSS. Alternatively, the frequency domain position of the PBCH is obtained based on time domain and frequency domain positions of the SSS. For example, in FIG. 6(a), a time domain position of a PBCH is the same as that of an SSS, and in frequency domain, the PBCH is located on an RB adjacent to that of the SSS. Alternatively, the frequency domain position of the PBCH is obtained based on time domain and frequency domain positions of the PSS and the SSS.

In this embodiment, several possible cases of obtaining the frequency domain position of the PBCH by using the PSS and/or the SSS are provided, thereby improving solution feasibility, and facilitating flexible network deployment.

It should be noted that, in one SSB, quantities of resource blocks occupied by a PSS and an SSS in frequency domain may be the same or different. This is not limited herein.

Further, compared with an existing SSB in which an SSS occupies one OFDM symbol, a PSS occupies one OFDM symbol, and a PBCH occupies three OFDM symbols, in the embodiments, a quantity of OFDM symbols occupied by the PSS is greater than 1, a quantity of OFDM symbols occupied by the SSS is greater than 1, and a quantity of OFDM symbols occupied by the PBCH is greater than 3, so that the synchronization signal and the broadcast channel occupy more OFDM symbols, energy can be accumulated in time domain, and signal coverage can be enhanced.

Optionally, 402. Send a second SSB to a second terminal device in an NR system.

In this embodiment, the first terminal device and the second terminal device are terminal devices in different communications systems. The second terminal device is a terminal device in an NR system. The first terminal device may also be a terminal device in an NR system, but the NR system in which the first terminal device is located and the NR system in which the second terminal device is located are different NR systems. Alternatively, the first terminal device may be a terminal device in an LTE system, an LTE-A system, or another communications system.

A structure and a resource occupation manner of the second SSB may be similar to those of the first SSB. A synchronization signal and a PBCH use the frequency division multiplexing manner in resource occupation. In addition, a quantity of OFDM symbols occupied by the synchronization signal is greater than 2, and a quantity of OFDM symbols occupied by the PBCH is greater than 3. For example, a quantity of OFDM symbols occupied by a PSS is greater than 1, and a quantity of OFDM symbols occupied by an SSS is greater than 1. Alternatively, the second SSB may be an SSB in an existing NR system. This is not limited herein.

In this embodiment, the base station needs to send the first SSB to the first terminal, and also needs to send the second SSB to the second terminal. The first SSB and the second SSB may occupy half-frames at different time domain positions. There are the following two cases.

Figure 5A:
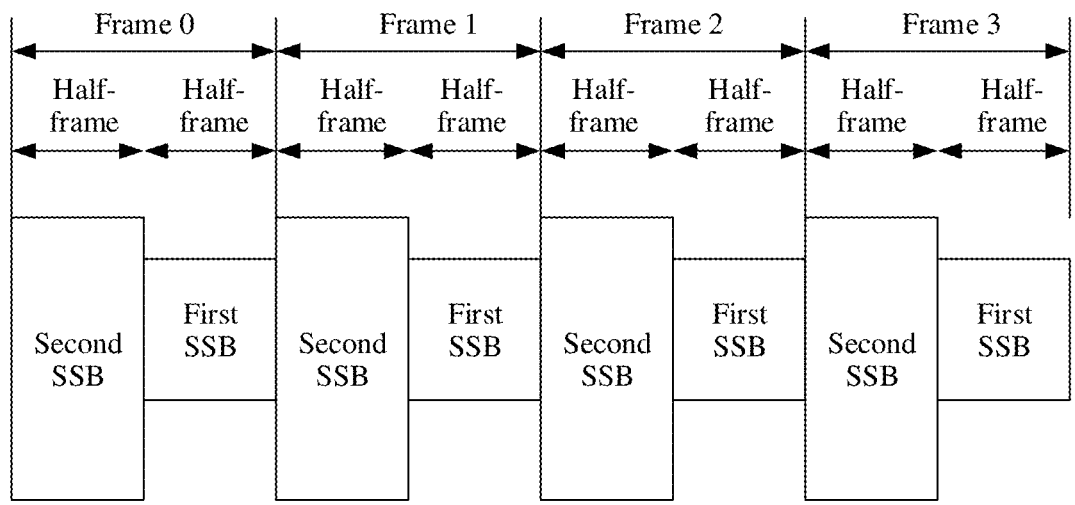
FIG. 5(a) is a schematic diagram of another embodiment of a signal transmission method.
Figure 5B:
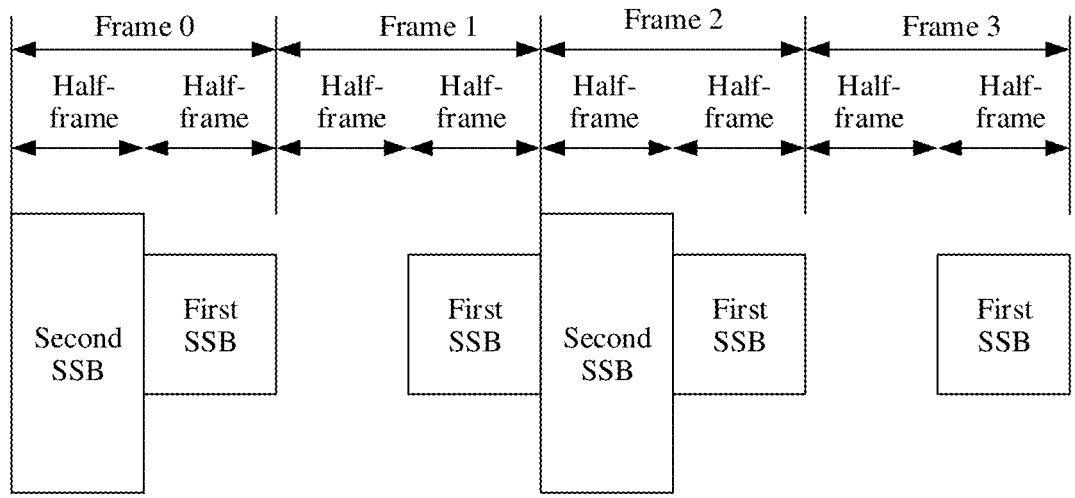
FIG. 5(b) is a schematic diagram of another embodiment of a signal transmission method.

Within a preset time length, as shown in FIG. 5(a), the second SSB occupies the first, third, fifth, and seventh half-frames, and the second SSB occupies the second, fourth, sixth, and eighth half-frames. That is, the first SSB and the second SSB occupy a same quantity of half-frames, and time domain positions of the occupied half-frames are different. In other words, the first SSB and the second SSB occupy different time domain resources. The preset time length is preset by the base station, and may be a signal transmission periodicity. As shown in FIG. 5(b), considering a coverage enhancement scenario, the second SSB occupies the first and fifth half-frames, and the second SSB occupies the second, fourth, sixth, and eighth half-frames. That is, the first SSB and the second SSB occupy different quantities of half-frames, and a quantity of half-frames occupied by the first SSB is greater than that of the second SSB. In this way, energy can be accumulated in time domain, and signal coverage can be enhanced. In addition, time domain positions of half-frames occupied by the first SSB and the second SSB are different.

Figure 5C:
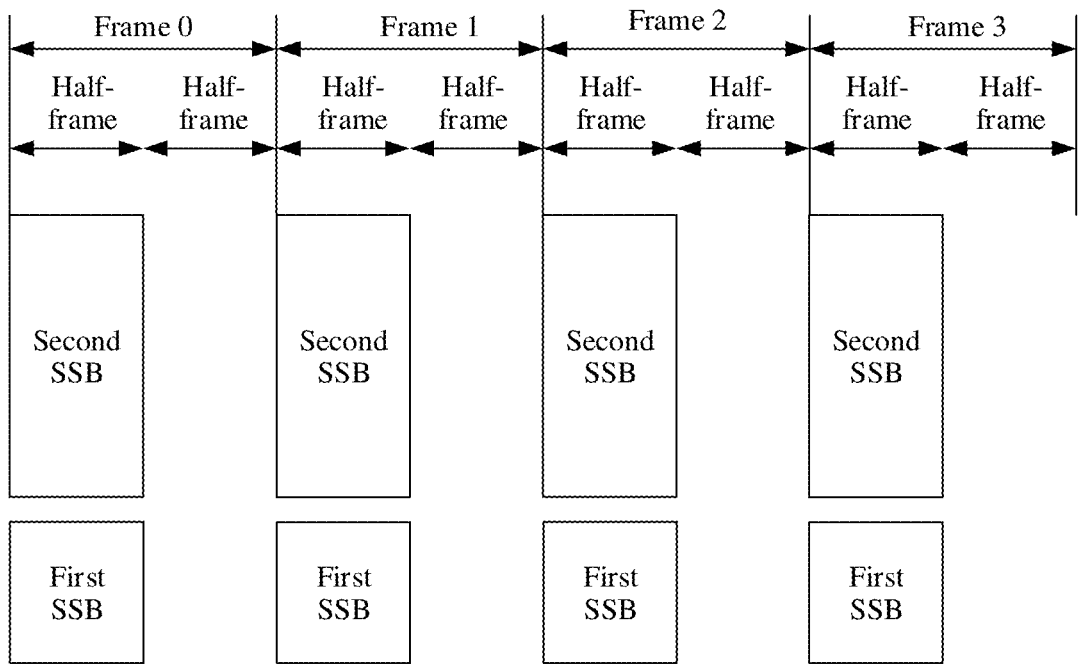
FIG. 5(c) is a schematic diagram of another embodiment of a signal transmission method.
Figure 5D:
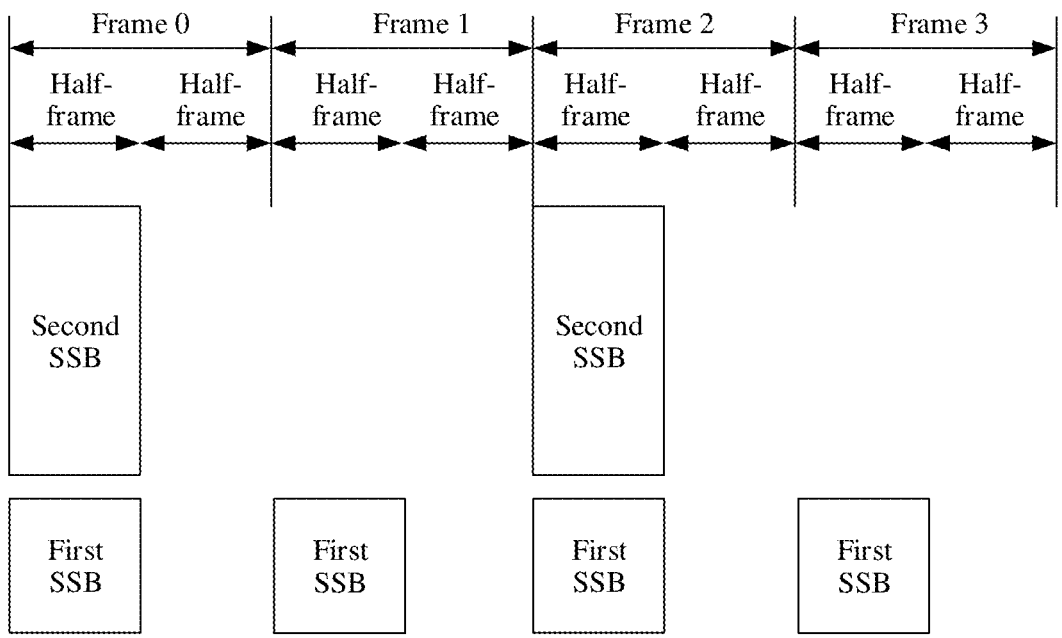
FIG. 5(d) is a schematic diagram of another embodiment of a signal transmission method.

In this embodiment, within a same preset time length, the first SSB and the second SSB may alternatively occupy half-frames at a same time domain position. There are the following two cases. As shown in FIG. 5(c), both the second SSB and the first SSB occupy the first, third, fifth, and seventh half-frames. That is, the first SSB and the second SSB occupy a same quantity of half-frames and occupy the same half-frames. Therefore, time domain resources occupied by the second SSB and the first SSB are the same. As shown in FIG. 5(d), also considering a coverage enhancement scenario, the first SSB occupies the first, third, fifth, and seventh half-frames, and the second SSB occupies the first and fifth half-frames. That is, the second SSB and the first SSB occupy different quantities of half-frames, and a quantity of half-frames occupied by the first SSB is greater than a quantity of half-frames occupied by the second SSB. In addition, time domain positions of some of the half-frames occupied by the second SSB and the first SSB are the same.

In this embodiment, in a process of initial cell access or cell measurement, the synchronization signal and the PBCH need to be sent continually. In this case, if the first SSB and the second SSB occupy a same time domain resource, at night or during low-traffic hours, the base station may intelligently shut down a subcarrier, subframe, or OFDM symbol part that is neither occupied by the first SSB nor by the second SSB, to achieve energy saving of the base station.

Further, in this embodiment, the half-frame in which the first SSB or the second SSB is located periodically occurs in time domain, and a specific periodicity may be configured by the network device. A configured periodicity value in a current NR protocol may be 5 ms, 10 ms, 20 ms, 40 ms, 80 ms, or 160 ms.

In an NR system, in a half-frame with an SSB, a start OFDM symbol of the SSB is determined based on a subcarrier bandwidth of the SSB. For a location of the SSB that may appear in time domain in NR, refer to 3GPP TS 38.213. Details are not described herein.

In the following description, for example, a subcarrier bandwidth is less than 3 GHz. One half-frame includes five subframes, and one subframe occupies 14 OFDM symbols. In FIG. 5(c) to FIG. 5(d), when the first SSB and the second SSB occupy a same half-frame resource, in one half-frame, the following resource occupation may be formed.

Figure 6A:
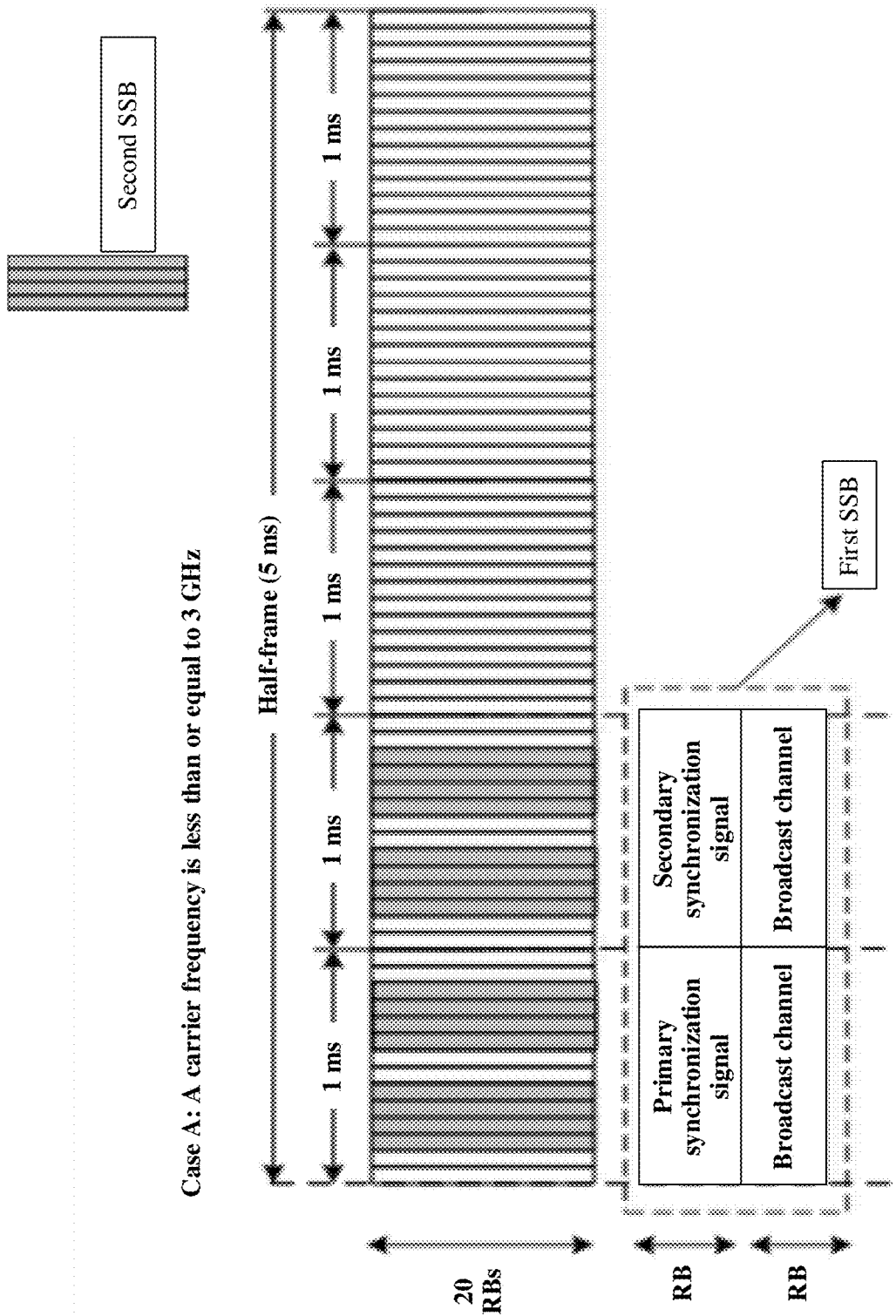
FIG. 6(a) is a schematic diagram of another embodiment of a signal transmission method.

As shown in FIG. 6(a), in the first SSB, the primary synchronization signal and the secondary synchronization signal use a time division multiplexing manner in resource occupation. The primary synchronization signal and the secondary synchronization signal occupy different subframes in time domain, but occupy a same resource block in frequency domain, and the resource block is a complete resource block. As shown in the figure, the primary synchronization signal occupies the first subframe, and the secondary synchronization signal occupies the second subframe. The broadcast channel (that is, the physical broadcast channel) and the primary synchronization signal use the frequency division multiplexing manner, which occupy a same subframe in time domain, and occupy different resource blocks in frequency domain. The broadcast channel and the secondary synchronization signal also use the frequency division multiplexing manner in resource occupation. Compared with the second SSB, the primary synchronization signal and the broadcast channel in the first SSB occupy a time domain resource at a same location as those in the second SSB, and the secondary synchronization signal and the broadcast channel in the first SSB occupy a time domain resource at a same location as those in the second SSB.

Figure 6B:
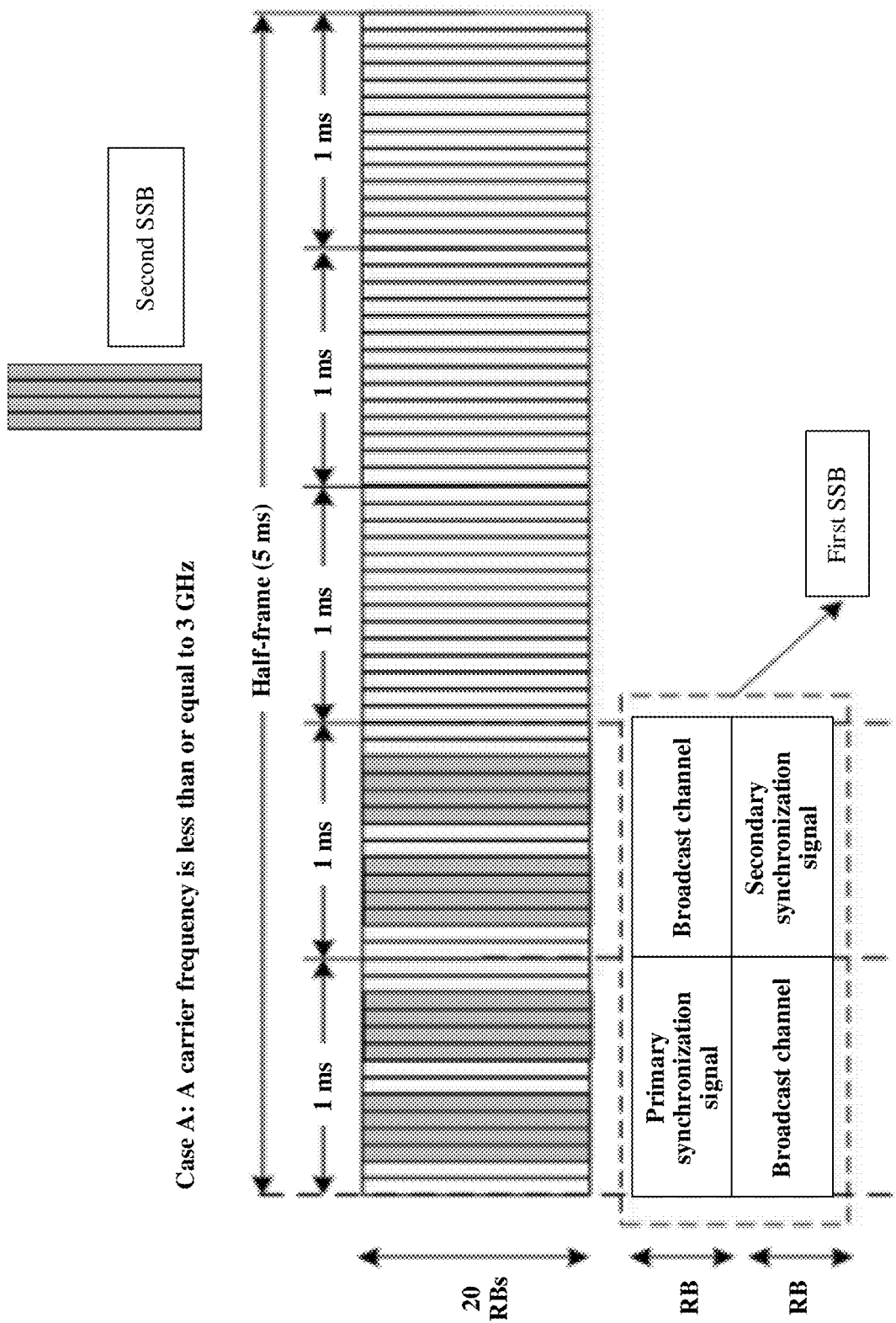
FIG. 6(b) is a schematic diagram of another embodiment of a signal transmission method.

As shown in FIG. 6(b), a difference from FIG. 6(a) lies in that, in addition to occupying different time domain resources, the primary synchronization signal and the secondary synchronization signal occupy different resource blocks in frequency domain, the primary synchronization signal occupies one complete resource block, and the secondary synchronization signal occupies another complete resource block.

Figure 6C:
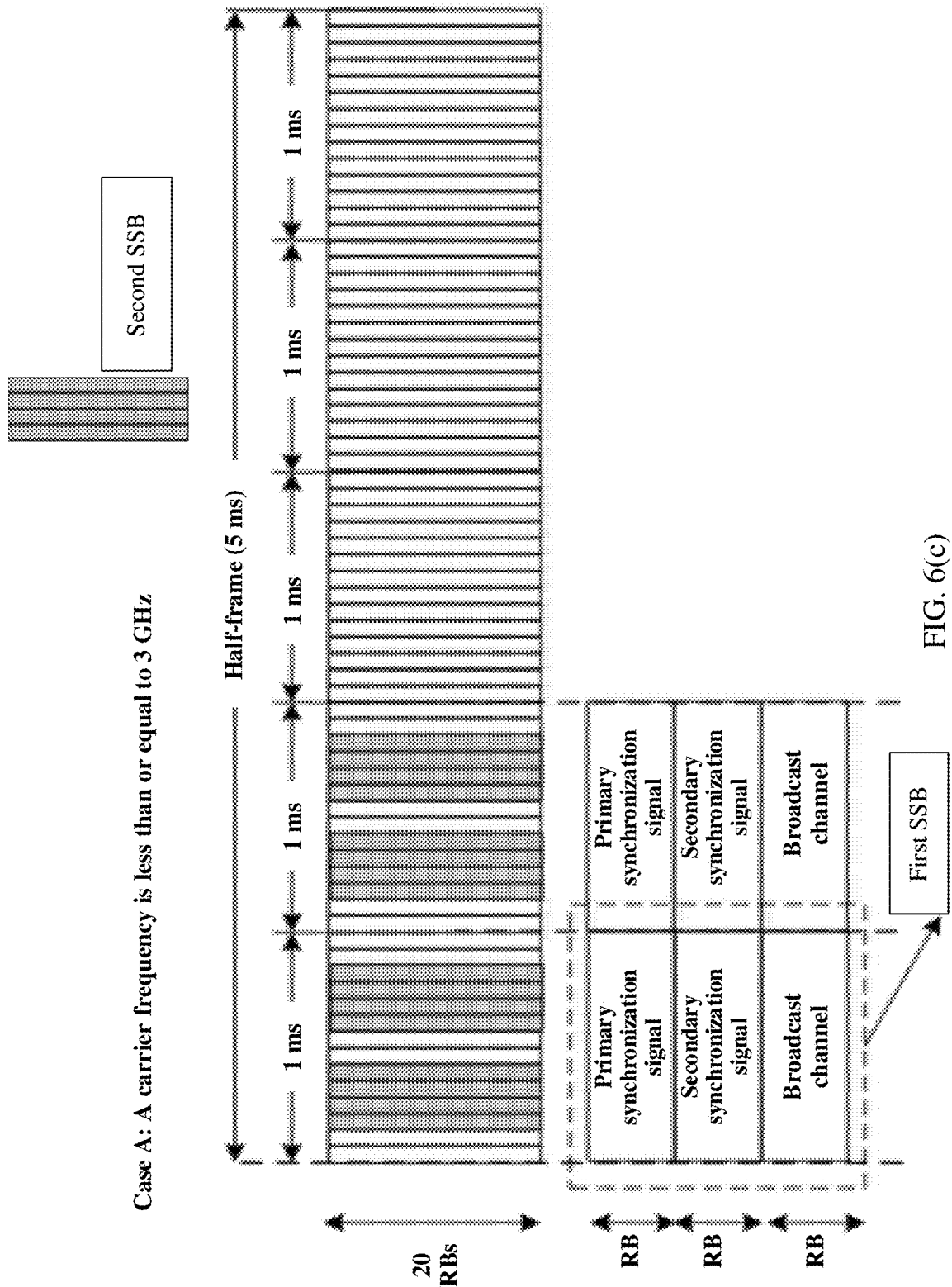
FIG. 6(c) is a schematic diagram of another embodiment of a signal transmission method.

As shown in FIG. 6(c), in the first SSB, the primary synchronization signal, the secondary synchronization signal, and the broadcast channel use the time division multiplexing manner, which occupy a same subframe in time domain, and occupy different resource blocks in frequency domain Compared with the second SSB, the primary synchronization signal, the secondary synchronization signal, and the broadcast channel in the first SSB occupy a time domain resource at a same location as those in the second SSB.

In FIG. 6(a) to FIG. 6(c), at night or during low-traffic hours, the base station may choose to intelligently shut down subframes that are neither occupied by the first SSB nor by the second SSB, to facilitate energy saving of the base station.

Figure 6D:
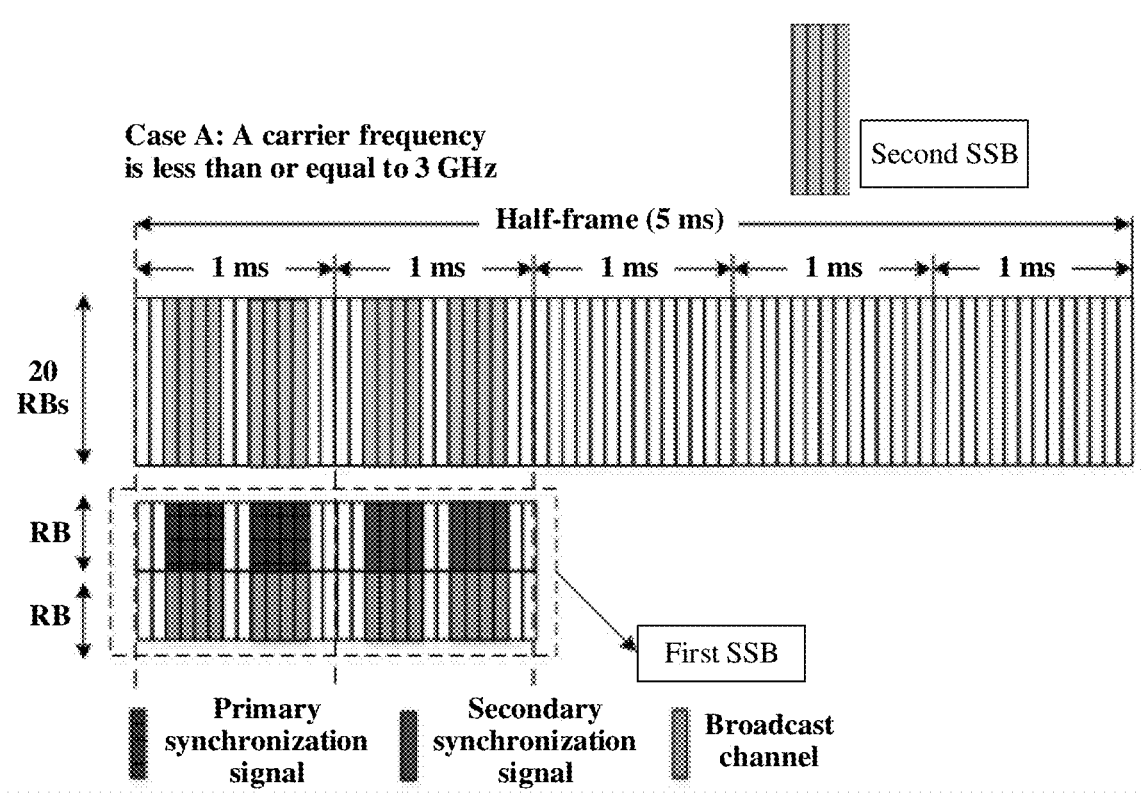
FIG. 6(d) is a schematic diagram of another embodiment of a signal transmission method.

As shown in FIG. 6(d), in the first SSB, the primary synchronization signal and the secondary synchronization signal use the time division multiplexing manner. The primary synchronization signal and the secondary synchronization signal occupy different time domain resources in time domain, and occupy a same resource block in frequency domain. As shown in the figure, the primary synchronization signal occupies the third to sixth OFDM symbols and the ninth to twelfth OFDM symbols of the first subframe, and the secondary synchronization signal occupies the third to sixth OFDM symbols and the ninth to twelfth OFDM symbols of the second subframe. The broadcast channel and the primary synchronization signal use the frequency division multiplexing manner, which occupy a same resource in time domain, and occupy different resource blocks in frequency domain. The broadcast channel and the secondary synchronization signal also use the frequency division multiplexing manner in resource occupation. Compared with the second SSB, the primary synchronization signal and the broadcast channel in the first SSB occupy the same OFDM symbols as those in the second SSB. As shown in the figure, the primary synchronization signal occupies two subframes, including eight OFDM symbols in total, which occupies the same OFDM symbols in each subframe as that in the second SSB. The secondary synchronization signal and the broadcast channel in the first SSB also occupy the same OFDM symbols as those in the second SSB, and details are not described. Compared with a manner in which only a same subframe is occupied in FIG. 6(a) to FIG. 6(c), this occupation manner is accurate to occupying a same OFDM symbol. The base station may choose to shut down OFDM symbols that are neither occupied by the first SSB nor by the second SSB, to further facilitate energy saving of the base station.

Figure 6E:
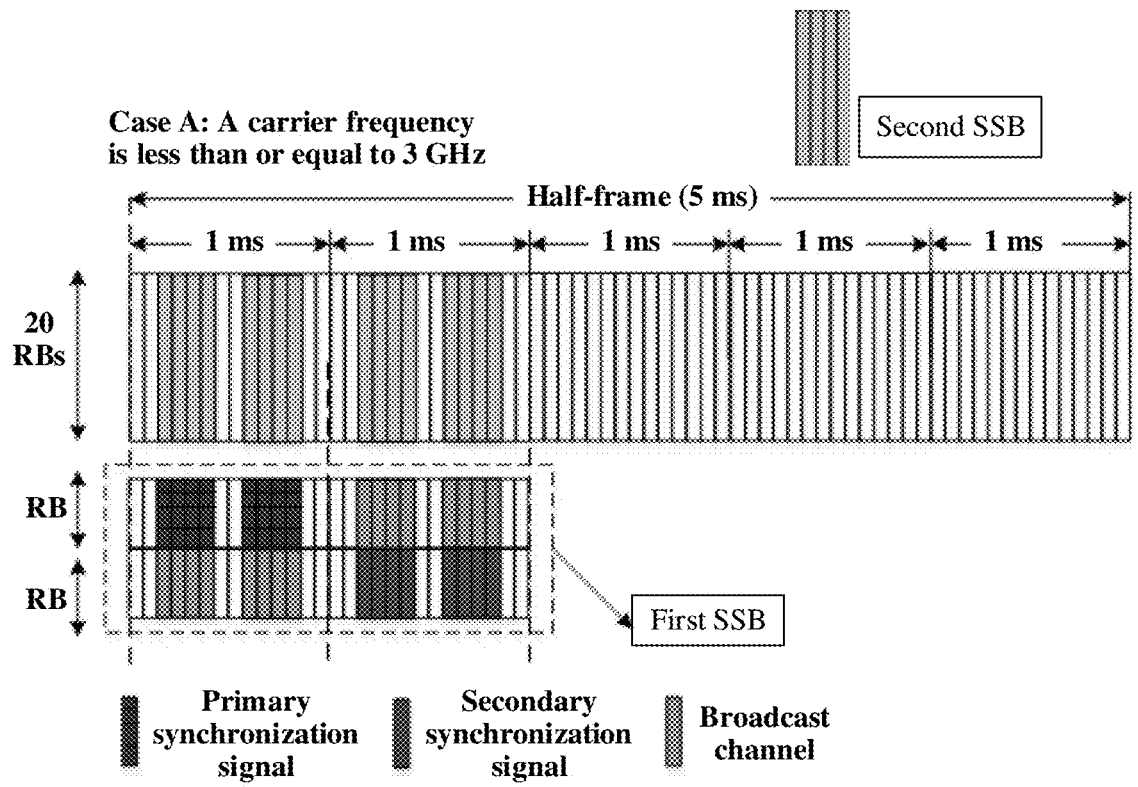
FIG. 6(e) is a schematic diagram of another embodiment of a signal transmission method.

FIG. 6(e) is similar to FIG. 6(d), and a difference lies in that, in addition to occupying different time domain resources, the primary synchronization signal and the secondary synchronization signal occupy different resource blocks in frequency domain, the primary synchronization signal occupies one complete resource block, and the secondary synchronization signal occupies another complete resource block.

Optionally, in this embodiment, a global synchronization channel number (GSCN) of the first SSB may be indicated in a system information of the NR system in which the second SSB is located. For example, when the GSCN of the first SSB is N*raster_NB+M*offset_NB, if raster_NB and offset_NB are known quantities, values of N and M may be carried in system information.

Figure 7:
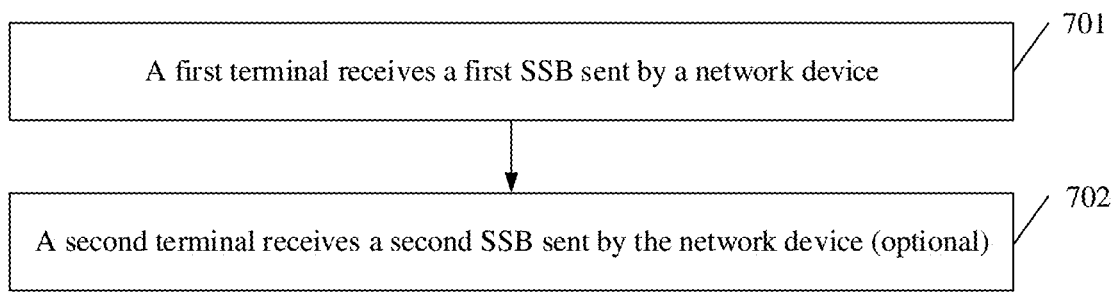
FIG. 7 is a schematic diagram of another embodiment of a signal transmission method.

The foregoing describes the embodiments from a perspective of a network device. The following describes the embodiments from a perspective of a terminal device with reference to FIG. 7.

701. A first terminal device receives a first SSB sent by a network device.

The first terminal device receives the first SSB sent by the network device. The first SSB includes a synchronization signal and a physical broadcast channel. The synchronization signal and the physical broadcast channel 1 use a frequency division multiplexing manner in resource occupation, so that a time domain resource occupied by the SSB is reduced, thereby reducing power consumption of the base station.

An implementation of this step in this embodiment is similar to that of step 401 in the foregoing embodiment, and details are not described herein again.

Optionally, 702. A second terminal device receives a second SSB sent by the network device.

In this embodiment, the first terminal device and the second terminal device are terminal devices in different communications systems. A specific implementation of this step in this embodiment is similar to step 402 in the foregoing embodiment, and details are not described herein again.

In this embodiment, the first terminal device receives the first SSB sent by the network device. Because the synchronization signal and the physical broadcast channel in the first SSB use the frequency division multiplexing manner in resource occupation, a time domain resource occupied by the SSB is reduced, thereby reducing power consumption of the base station. In addition, the second terminal device receives the second SSB sent by the network device, and the first SSB and the second SSB may occupy a same time domain resource, so that power consumption of the base station can also be reduced.

Figure 8:
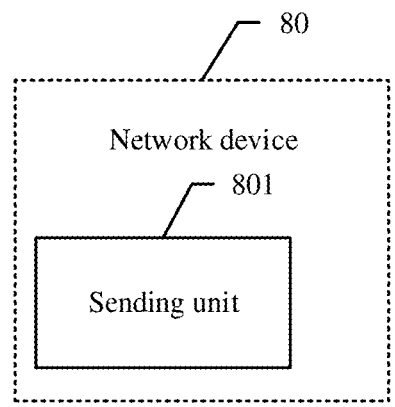
FIG. 8 shows another possible structure of a network device.

FIG. 8 shows another possible structure of a network device 80 according to the embodiments. The network device 80 includes the following unit.

A sending unit 801 is configured to send a first SSB to a first terminal device, where the first SSB includes a synchronization signal and a PBCH, the synchronization signal and the PBCH use a FDM manner in resource occupation, a quantity of OFDM symbols occupied by the synchronization signal is greater than 2, and a quantity of OFDM symbols occupied by the PBCH is greater than 3.

Optionally, the synchronization signal includes a PSS and a SSS, a quantity of orthogonal frequency division multiplexing OFDM symbols occupied by the PSS is greater than 1, and a quantity of OFDM symbols occupied by the SSS is greater than 1.

Optionally, that the synchronization signal and the PBCH use an FDM manner in resource occupation includes:

the PSS and the PBCH use the FDM manner in resource occupation, and/or the SSS and the PBCH use the FDM manner in resource occupation.

Optionally, a frequency domain position of the PBCH is indicated by using the PSS and/or the SSS; or a frequency domain position of the PBCH is obtained based on a frequency domain position of the PSS and/or a frequency domain position of the SSS.

Optionally, the sending unit is further configured to send a second SSB to a second terminal device in an NR system, where the second terminal device and the first terminal device are terminal devices in different communications systems.

Optionally, the first SSB and the second SSB occupy half-frames at a same time domain position; and that the first SSB and the second SSB occupy half-frames at a same time domain position includes:

the second SSB and the first SSB occupy a same quantity of half-frames within a preset time length, and time domain positions of the occupied half-frames are the same; or the second SSB and the first SSB occupy different quantities of half-frames within a preset time length, and time domain positions of some of the occupied different quantities of half-frames are the same.

Optionally, in one half-frame, a subframe occupied by the PSS is the same as that of the second SSB in the NR system in time domain, and a subframe occupied by the SSS is the same as that of the second SSB in the NR system in time domain; or in one half-frame, an OFDM symbol occupied by the PSS is the same as that of the second SSB in the NR system, and an OFDM symbol occupied by the SSS is the same as that of the second SSB in the NR system.

Optionally, a GSCN of the first SSB is indicated in a system information of the NR system.

Optionally, the PSS and the SSS use a time division multiplexing manner or the frequency division multiplexing manner in resource occupation.

Optionally, the first SSB and the second SSB occupy half-frames at different time domain positions; and that the first SSB and the second SSB occupy half-frames at different time domain positions includes:

the second SSB and the first SSB occupy a same quantity of half-frames within a preset time length, and time domain positions of the occupied half-frames are different; or the second SSB and the first SSB occupy different quantities of half-frames within a preset time length, and time domain positions of the occupied half-frames are different.

Figure 9:
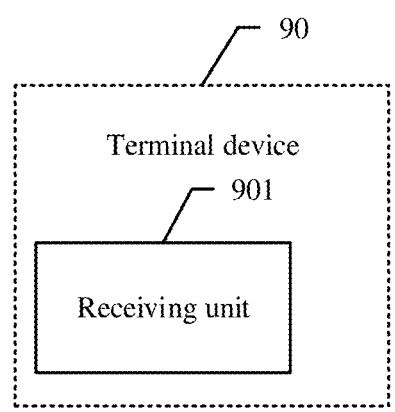
FIG. 9 shows another possible structure of a terminal device.

FIG. 9 shows another possible structure of a terminal device 90 according to the embodiments. The terminal device 90 includes the following unit.

A receiving unit 901 is configured to receive a first SSB sent by a network device, where the first SSB includes a synchronization signal and a PBCH, the synchronization signal and the PBCH use an FDM manner in resource occupation, a quantity of OFDM symbols occupied by the synchronization signal is greater than 2, and a quantity of OFDM symbols occupied by the PBCH is greater than 3.

Optionally, the synchronization signal includes a PSS and a SSS, a quantity of OFDM symbols occupied by the PSS is greater than 1, and a quantity of OFDM symbols occupied by the SSS is greater than 1.

Optionally, that the synchronization signal and the PBCH use an FDM manner in resource occupation includes:

the PSS and the PBCH use the FDM manner in resource occupation, and/or the SSS and the PBCH use the FDM manner in resource occupation.

Optionally, a frequency domain position of the PBCH is indicated by using the PSS and/or the SSS; or a frequency domain position of the PBCH is obtained based on a frequency domain position of the PSS and/or a frequency domain position of the SSS.

Optionally, the first SSB and a second SSB occupy half-frames at a same time domain position, the second SSB is an SSB sent by the network device to a second terminal device in an NR system, and the second terminal device and the first terminal device are terminal devices in different communications systems; and that the first SSB and the second SSB occupy half-frames at a same time domain position includes:

the second SSB and the first SSB occupy a same quantity of half-frames within a preset time length, and time domain positions of the occupied half-frames are the same; or the second SSB and the first SSB occupy different quantities of half-frames within a preset time length, and time domain positions of some of the occupied different quantities of half-frames are the same.

Optionally, in one half-frame, a subframe occupied by the PSS is the same as that of the second SSB in the NR system in time domain, and a subframe occupied by the SSS is the same as that of the second SSB in the NR system in time domain; or in one half-frame, an OFDM symbol occupied by the PSS is the same as that of the second SSB in the NR system, and an OFDM symbol occupied by the SSS is the same as that of the second SSB in the NR system.

Optionally, a GSCN of the first SSB is indicated in a system information of the NR system.

Optionally, the PSS and the SSS use a time division multiplexing manner or the frequency division multiplexing manner in resource occupation.

It should be noted that content such as information exchange between the modules/units of the apparatus and the execution processes thereof is based on the same idea as the method embodiments, and produces the same effects as the method embodiments. For the specific content, refer to the foregoing descriptions in the method embodiments. Details are not described herein again.

In addition, it should be noted that the described apparatus embodiment is merely an example. The units described as separate parts may or may not be physically separate, and parts displayed as units may or may not be physical units, may be located in one position, or may be distributed on a plurality of network units. Some or all the modules may be selected based on actual needs to achieve the objectives of the solutions of the embodiments. In addition, in the accompanying drawings of the apparatus embodiments, connection relationships between modules indicate that the modules have communications connections with each other, which may be specifically implemented as one or more communications buses or signal cables.

Based on the descriptions of the foregoing implementations, a person of ordinary skill in the art may understand that the embodiments may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, for the embodiments, the software program implementation is a better implementation in most cases. Based on such an understanding, the solutions of the embodiments essentially or the part contributing to the conventional technology may be implemented in a form of a software product. The computer software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, or the like) to perform the methods described in the embodiments.

All or some of the foregoing embodiments may be implemented by using software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, the procedure or functions according to the embodiments are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

What is claimed is:

1. A signal transmission method, wherein the method comprises:
   sending a first synchronization signal/physical broadcast channel block (SSB) to a first terminal device, wherein the first SSB comprises a synchronization signal and a physical broadcast channel (PBCH), the synchronization signal and the PBCH use a frequency division multiplexing (FDM) manner in resource occupation, a quantity of orthogonal frequency division multiplexing (OFDM) symbols occupied by the synchronization signal is greater than 2, and a quantity of OFDM symbols occupied by the PBCH is greater than 3; and
   sending a second SSB to a second terminal device in a new radio (NR) system, wherein the second terminal device and the first terminal device are terminal devices in different communications systems.

2. The method according to claim 1, wherein the synchronization signal comprises a primary synchronization signal (PSS) and a secondary synchronization signal (SSS), a quantity of OFDM symbols occupied by the PSS is greater than 1, and a quantity of OFDM symbols occupied by the SSS is greater than 1.

3. The method according to claim 2, wherein that the synchronization signal and the PBCH use an FDM manner in resource occupation comprises:
   the PSS and the PBCH use the FDM manner in resource occupation, and/or the SSS and the PBCH use the FDM manner in resource occupation.

4. The method according to claim 2, wherein a frequency domain position of the PBCH is indicated by using the PSS and/or the SSS; or
   a frequency domain position of the PBCH is obtained based on a frequency domain position of the PSS and/or a frequency domain position of the SSS.

5. A signal transmission method, comprising:
   receiving a first synchronization signal/broadcast channel block (SSB) sent by a network device, wherein the first SSB comprises a synchronization signal and a physical broadcast channel (PBCH), the synchronization signal and the PBCH use a frequency division multiplexing (FDM) manner in resource occupation, a quantity of orthogonal frequency division multiplexing (OFDM) symbols occupied by the synchronization signal is greater than 2, and a quantity of OFDM symbols occupied by the PBCH is greater than 3;
   wherein the first SSB and a second SSB occupy half-frames at a same time domain position, the second SSB is an SSB sent by the network device to a second terminal device in a new radio (NR) system, and the second terminal device and the first terminal device are terminal devices in different communications systems.

6. The method according to claim 5, wherein the synchronization signal comprises a primary synchronization signal (PSS) and a secondary synchronization signal (SSS), a quantity of OFDM symbols occupied by the PSS is greater than 1, and a quantity of OFDM symbols occupied by the SSS is greater than 1.

7. The method according to claim 6, wherein that the synchronization signal and the PBCH use an FDM manner in resource occupation comprises:
   the PSS and the PBCH use the FDM manner in resource occupation, and/or the SSS and the PBCH use the FDM manner in resource occupation.

8. The method according to claim 6, wherein a frequency domain position of the PBCH is indicated by using the PSS and/or the SSS; or
   a frequency domain position of the PBCH is obtained based on a frequency domain position of the PSS and/or a frequency domain position of the SSS.

9. The method according to claim 5, wherein
   that the first SSB and the second SSB occupy half-frames at a same time domain position comprises:
   the second SSB and the first SSB occupy a same quantity of half-frames within a preset time length, and time domain positions of the occupied half-frames are the same; or
   the second SSB and the first SSB occupy different quantities of half-frames within a preset time length, and time domain positions of some of the occupied different quantities of half-frames are the same.

10. A network device, comprising:
    a memory storing a program; and
    at least one processor in communication with the memory, wherein the at least one processor is configured to execute the program to:
    send a first synchronization signal/broadcast channel block (SSB) to a first terminal device, wherein the first SSB comprises a synchronization signal and a physical broadcast channel (PBCH), the synchronization signal and the PBCH use a frequency division multiplexing (FDM) manner in resource occupation, a quantity of orthogonal frequency division multiplexing (OFDM)

symbols occupied by the synchronization signal is greater than 2, and a quantity of OFDM symbols occupied by the PBCH is greater than 3; and send a second SSB to a second terminal device in a new radio (NR) system, wherein the second terminal device and the first terminal device are terminal devices in different communications systems.

11. The network device according to claim 10, wherein the synchronization signal comprises a primary synchronization signal (PSS) and a secondary synchronization signal (SSS), a quantity of OFDM symbols occupied by the PSS is greater than 1, and a quantity of OFDM symbols occupied by the SSS is greater than 1.

12. The network device according to claim 11, wherein that the synchronization signal and the PBCH use an FDM manner in resource occupation comprises:

the PSS and the PBCH use the FDM manner in resource occupation, and/or the SSS and the PBCH use the FDM manner in resource occupation.

13. The network device according to claim 11, wherein a frequency domain position of the PBCH is indicated by using the PSS and/or the SSS; or a frequency domain position of the PBCH is obtained based on a frequency domain position of the PSS and/or a frequency domain position of the SSS.

14. A terminal device, comprising:

a memory storing a program; and at least one processor in communication with the memory, wherein the at least one processor is configured to execute the program to:

receive a first synchronization signal/broadcast channel block (SSB) sent by a network device, wherein the first SSB comprises a synchronization signal and a physical broadcast channel (PBCH), the synchronization signal and the PBCH use a frequency division multiplexing (FDM) manner in resource occupation, a quantity of orthogonal frequency division multiplexing (OFDM) symbols occupied by the synchronization signal is greater than 2, and a quantity of OFDM symbols occupied by the PBCH is greater than 3;

wherein the first SSB and a second SSB occupy half-frames at a same time domain position, the second SSB is an SSB sent by the network device to a second terminal device in a new radio (NR) system, and the second terminal device and the first terminal device are terminal devices in different communications systems.

15. The terminal device according to claim 14, wherein the synchronization signal comprises a primary synchronization signal (PSS) and a secondary synchronization signal (SSS), a quantity of orthogonal frequency division multiplexing OFDM symbols occupied by the PSS is greater than 1, and a quantity of OFDM symbols occupied by the SSS is greater than 1.

16. The terminal device according to claim 15, wherein that the synchronization signal and the PBCH use an FDM manner in resource occupation comprises:

the PSS and the PBCH use the FDM manner in resource occupation, and/or the SSS and the PBCH use the FDM manner in resource occupation.

17. The terminal device according to claim 15, wherein a frequency domain position of the PBCH is indicated by using the PSS and/or the SSS; or a frequency domain position of the PBCH is obtained based on a frequency domain position of the PSS and/or a frequency domain position of the SSS.

18. The terminal device according to claim 14, wherein that the first SSB and the second SSB occupy half-frames at a same time domain position comprises:

the second SSB and the first SSB occupy a same quantity of half-frames within a preset time length, and time domain positions of the occupied half-frames are the same; or the second SSB and the first SSB occupy different quantities of half-frames within a preset time length, and time domain positions of some of the occupied different quantities of half-frames are the same.

* * * * *